Figure 1:
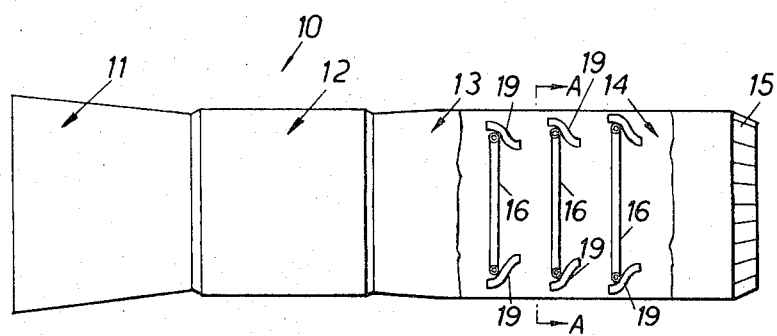

United States Patent [19]
Anley

[11] 3,786,632

[45] Jan. 22, 1974

[54] REHEAT SYSTEM FOR A GAS TURBINE ENGINE

[75] Inventor: Donald Maynard Anley, Long Eaton, England

[73] Assignee: Rolls-Royce (1971) Limited, London, England

[22] Filed: Aug. 7, 1972

[21] Appl. No.: 278,342

[30] Foreign Application Priority Data
Aug. 21, 1971 Great Britain.................. 39,332/71

[52] U.S. Cl............. 60/39.74 R, 60/261, 239/419.3
[51] Int. Cl. .............................................. F02c 7/22
[58] Field of Search........ 60/261, 39.74 R, 39.72 R; 137/604; 239/429, 432, 419.3, 419.5

[56] References Cited
UNITED STATES PATENTS
2,705,869  4/1955  Johnstone......................... 60/261 X
3,151,453  10/1964  Lefebvre et al................ 60/39.72 R
3,652,016  3/1972  Cheshire......................... 60/39.74 R
1,082,130  12/1913  McCallen............................. 239/432
3,483,649  12/1969  Harvey............................ 60/39.74 R Primary Examiner—Carlton R. Croyle
Assistant Examiner—Robert E. Garrett
Attorney, Agent, or Firm—Cushman, Darby & Cushman

[57] ABSTRACT

A reheat system for a gas turbine engine is provided with fuel supply means, a plurality of fuel manifolds having fuel distribution holes or nozzles located thereon, fuel/exhaust gas mixing means associated with each of the holes or nozzles and flame stabilisation means located downstream of the fuel manifolds. The mixing means are adapted in operation to tap exhaust gases from a portion of the reheat system, to mix the exhaust gases with fuel from their respective associated fuel nozzles or holes and exhaust the mixture into the combustion zone of the reheat system.

5 Claims, 4 Drawing Figures

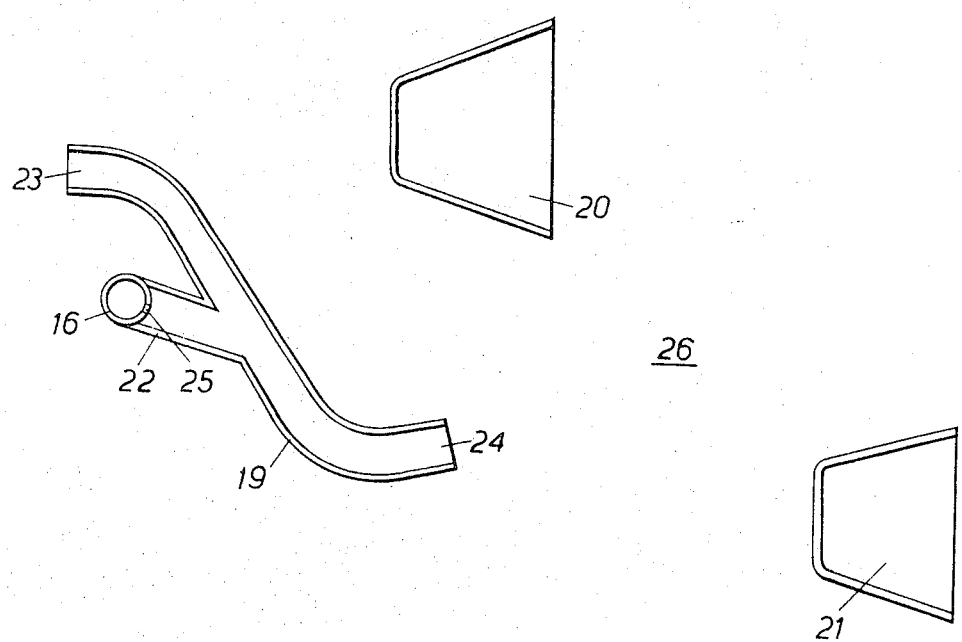
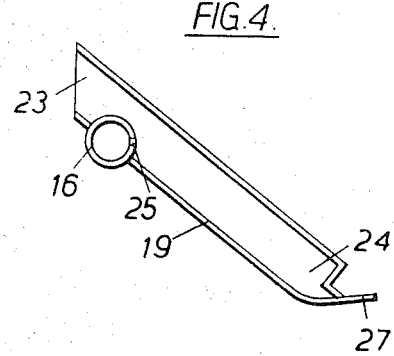

3,786,632

REHEAT SYSTEM FOR A GAS TURBINE ENGINE

This invention relates to reheat systems for gas turbine engines.

It has been proposed to direct fuel from the fuel nozzles of a gas turbine engine reheat system into the combustion zone of the said system via a series of stub pipes. Whilst such stub pipes are effective in directing the fuel into the combustion zone, it has been found that there is a tendency for the fuel to boil within the stub pipes, thus resulting in an intermittent fuel flow into the combustion zone.

It is an object of the present invention to eliminate this tendency by ensuring that the fuel within the stub pipes is substantially in its vapour phase and therefore unable to boil.

According to the present invention, a reheat system for a gas turbine engine includes fuel supply means, a plurality of fuel manifolds having fuel distribution holes or nozzles located thereon, fuel/exhaust gas mixing means associated with each of said holes or nozzles and flame stabilisation means located downstream of said fuel manifolds, said mixing means being adapted in operation to tap exhaust gases from a portion of said reheat system, to mix the exhaust gases with fuel from their respective associated fuel nozzles or holes and exhaust the mixture into the combustion zone of said reheat system.

Each of said fuel/exhaust gas mixing means may comprise a conduit having an upstream directed inlet in said portion of said reheat system, an outlet directed towards the combustion zone of said reheat and a fuel inlet located between said upstream directed inlet and said outlet.

Preferably said fuel inlet is connected by means of a further conduit to said fuel nozzle or hole.

Alternatively said fuel nozzle or hole may comprise said fuel inlet.

The outlets of each of said fuel/exhaust gas mixing means may be baffled.

Figure 2:
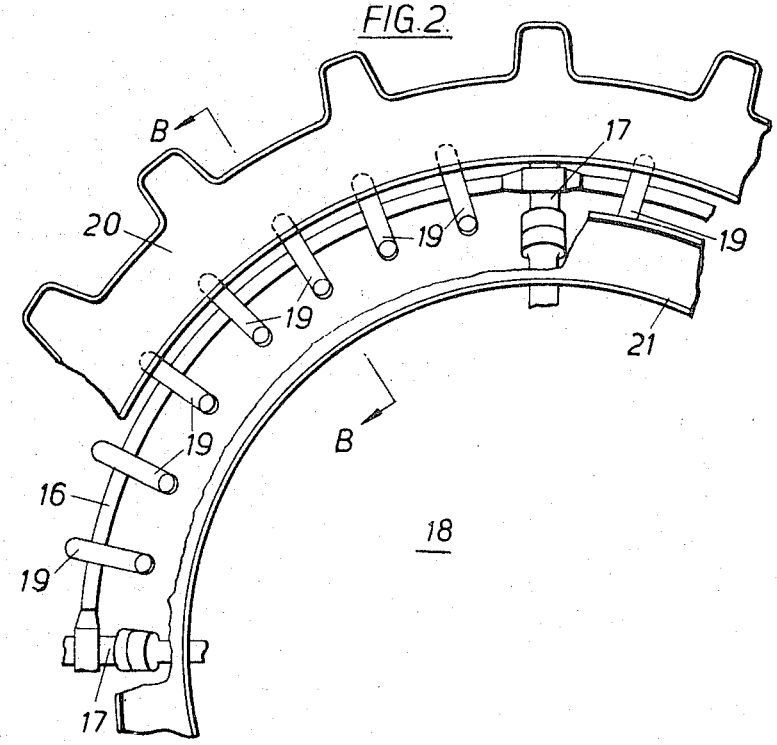

The invention will now be particularly described with reference to the accompanying drawings in which:

FIG. 1 is a side view of a gas turbine engine provided with a reheat system according to the present invention, the view being partly broken away to show the plurality of manifolds, FIG. 2 is a view on A—A of FIG. 1 showing in part section a portion of a reheat system according to the present invention, FIG. 3 is a view on B—B of FIG. 2 showing a fuel hole and its associated stub pipe, FIG. 4 is an alternative form of construction of the stub pipe shown in FIG. 3.

With reference to FIG. 1, a gas turbine engine 10 is provided with, in axial flow series, compressor means 11, combustion means 12, turbine means 13, a reheat system 14 and a variable cross-section area nozzle 15. Reheat system 14 is provided with a plurality of axially disposed annular fuel spray manifolds, a portion of one of which 16 can be seen in FIG. 2.

Fuel manifold 16 is supplied with fuel by four equiangularly spaced apart fuel supply pipes 17, two of which can be seen in FIG. 2. In addition to being supplied with fuel by pipes 17, fuel manifold 16 is also fixedly located thereon. Fuel, after entering fuel manifold 16 is exhausted therefrom into the reheat duct 18 via a plurality of generally radially extending radially spaced apart downstream exhausting stub pipes 19. Downstream of the fuel manifold 16 are located two annular, axially spaced apart flame stabilisation gutters 20 and 21.

The construction of the stub pipes 19 can be more easily seen in FIG. 3. Each stub pipe 19 is fixedly attached to the annular fuel manifold 16 by a short, axially extending connecting pipe 22. The radially outer portion of the stub pipe 19 is curved in a generally axially upstream direction such that its inlet 23 is positioned so as to receive a portion of the exhaust gases which flow along the radially outer reaches of the reheat duct 18 during engine operation. It will be appreciated that exhaust gases passing through the reheat duct will, in addition to containing combustion products, also contain air. The radially inner portion of the stub pipe 19 is curved in a generally downstream direction such that its outlet 24 is directed towards the combustion zone 26 of the reheat duct 18. It will be seen therefore that during engine operation, some of the exhaust gases passing along the radially outer reaches of the reheat duct 18 will enter stub pipes 19 via their upstream inlets 23 and exhaust therefrom via their downstream outlets 24 into the combustion zone 26 of the reheat duct 18.

Fuel holes 25 are positioned on fuel manifold 16 such that, when reheat system 14 is in operation, fuel is directed into the stub pipes 19 via connecting pipes 22. As the fuel enters the stub pipes 19, the flow of exhaust gases passing therethrough assists in the vapourisation of the fuel before directing it into the combustion zone 26 via the downstream outlets 24.

It will be appreciated therefore that by vapourising the fuel within the stub pipes 19, the tendency of the fuel therein to boil is avoided. Thus a substantially continuous flow of fuel vapour is supplied to the combustion zone 26.

An alternative form of stub pipe 19 is shown in FIG. 4. The features of the stub pipe shown in FIG. 4 which are common with the stub pipe shown in FIG. 3 are numbered correspondingly. As can be seen, the stub pipe 19 is straight and fixedly disposed directly on the fuel manifold 16 such that its chamfered radially outer inlet 23 is positioned so as to tap air from the aforementioned flow of air along the reaches of the reheat duct 18. The radially inner downstream directed outlet 24 of the stub pipe 19 is provided with a baffle 27 so as to ensure efficient fuel distribution within the combustion zone 26.

We claim:

1. A reheat system for a gas turbine engine comprising: fuel supply means; a plurality of axially disposed fuel manifolds each operatively connected to said fuel supply means and each having a plurality of distribution nozzles thereon; fuel/exhaust gas mixing means operatively connected with each of said nozzles of each of said fuel manifold means; and flame stabilization means positioned downstream of said fuel manifold means, each of said mixing means being arranged in operation to tap exhaust gases from a portion of said reheat system radially outwardly of said respective fuel manifolds and to mix the exhaust gases with fuel from the respective associated fuel nozzles and to exhaust the mixture of exhaust gases and fuel into the combustion zone of said reheat system at a position radially inwardly of the respective manifolds, and said mixing means extending transversely to the flow of exhaust gases through said reheat system whereby said exhaust gases and said mixture of exhaust gases and fuel flow from a cooler zone and are discharged in a hotter zone of said reheat system.

2. A reheat system as claimed in claim 1 wherein each of said fuel/exhaust gas mixing means comprises a conduit having an upstream directed inlet in said portion of said reheat system, and a downstream outlet directed towards the combustion zone of said reheat system and a fuel inlet located between said upstream directed inlet and said downstream outlet.

3. A reheat system as claimed in claim 2 wherein said fuel inlet is connected by means of a further conduit to said fuel nozzle in the respective manifolds.

4. A reheat system as claimed in claim 2 wherein said fuel nozzle comprises said fuel inlet in the respective manifolds.

5. A reheat system as claimed in claim 2 wherein the outlets of said fuel/exhaust gas mixing means include a baffle for directing the exhaust and gas mixture inwardly.

* * * * *